Jan. 18, 1949.                J. M. NICKELSEN ET AL                2,459,716
                                  TIRE PUMP CONNECTION
                                  Filed April 29, 1946
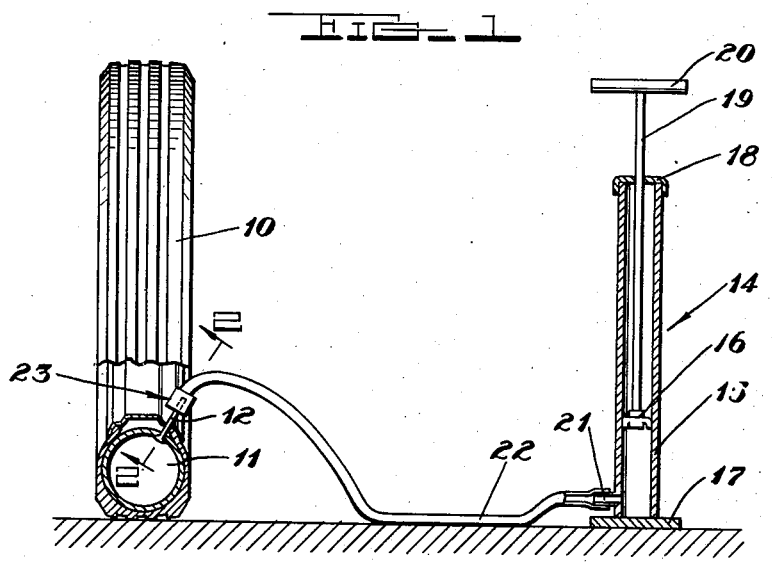
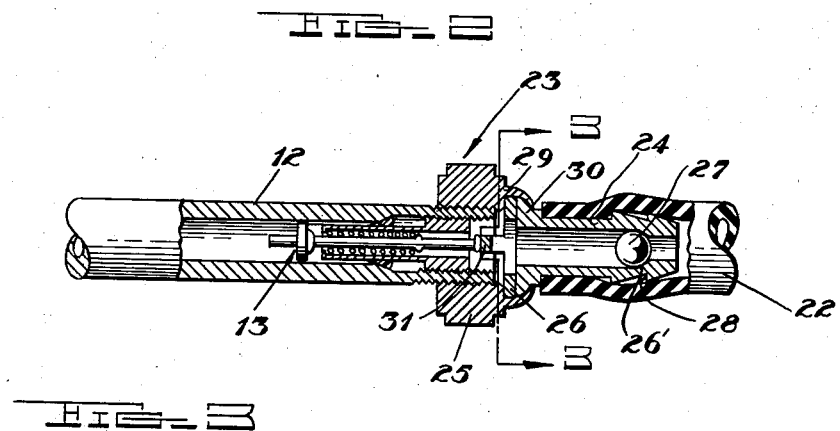
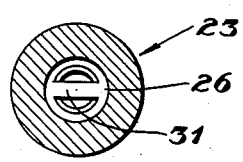
INVENTOR.
JOHN M. NICKELSEN
HENRY W. EMERICK.
BY
ATTORNEYS Patented Jan. 18, 1949

2,459,716

UNITED STATES PATENT OFFICE 2,459,716

TIRE PUMP CONNECTION

John M. Nickelsen, Ann Arbor, and Henry W. Emerick, Monroe, Mich., assignors to Monroe Auto Equipment Company, Monroe, Mich., a corporation of Michigan Application April 29, 1946, Serial No. 665,759

2 Claims. (Cl. 284—18)

This invention relates generally to displacement pumps and refers more particularly to improvements in pumps of the type used to inflate pneumatic tires.

In the manufacture of tire pumps it is customary to install a check valve in the base of the pump and to connect the check valve to a length of flexible conduit or hose having a fitting on the free end for opening the tire valve. This general type of construction complicates manufacture because it necessitates forming the check valve and tire valve operating fitting separately. Furthermore, difficulty has been frequently encountered in assembling the check valve on the pump base due to rust and dirt which may accumulate on the parts prior to assembly.

One of the objects of this invention is to overcome the above objections by incorporating the check valve in a fitting attachable to the free end of the hose and by combining the means for opening the tire valve with the fitting.

The foregoing as well as other objects will be made more apparent as this description proceeds, especially when considered in connection with the accompanying drawing, wherein:

Figure 1 is a semidiagrammatic view illustrating a tire pump assembly embodying the features of this invention;

Figure 2 is a sectional view through the fitting forming a part of the pump assembly; and Figure 3 is a cross sectional view taken substantially on the plane indicated by the line 3—3 of Figure 2.

The pump forming the subject matter of this invention is adapted for use in connection with a conventional pneumatic tire comprising a casing 10 and an inner tube 11. The inner tube 11 is provided with the usual valve stem 12 extending outwardly from the tube and housing a normally closed tire valve assembly 13. The outer end of the valve stem 12 is externally threaded for threadably engaging a dust cap not shown herein.

A typical pump for inflating the pneumatic tire is indicated in Figure 1 of the drawing by the reference character 14. The pump 14 comprises a vertical cylinder in the form of a length of tubing 15 and a piston 16 slidably supported in the cylinder. The bottom of the cylinder is closed by a support engaging base plate 17 and the top of the cylinder is closed by a cap 18. The piston 16 is reciprocated in the cylinder 15 by a rod 19 projecting downwardly through a central opening in the cap 18 and secured to the piston. A suitable handle 20 is fixed to the upper end of the rod to facilitate operation of the piston.

The lower end of the cylinder 15 is formed with a tubular projection 21 and the bore through the projection communicates with the interior of the cylinder 15 to enable air displaced by the piston to discharge from the cylinder. A flexible conduit in the form of hose 22 is removably secured at one end to the tubular projection 21 for receiving the air discharged from the pump cylinder 15. The free end of the flexible conduit 22 is removably secured to a fitting 23 and the latter is constructed to permit readily attaching the free end of the tube to the valve stem 12 of the pneumatic tire.

The fitting 23 comprises an elongated body member 24, a cap 25 and a sealing gasket 26. The body 24 is axially bored to provide an air passage therethrough and is formed with an annular valve seat 26 adjacent the inner end of the passage for engagement with a ball check valve member 27. The purpose of the check valve 27 is to prevent the escape of air from the inner tube 11 to the pump cylinder 15 on the suction stroke of the piston 16. The free end of the flexible conduit 22 is adapted to telescope the body 24 of the fitting and a plurality of axially spaced annular ridges 28 are formed on the outer surface of the body to grip the adjacent portion of the flexible conduit 22.

The cap 25 of the fitting 23 is internally threaded for threadably engaging the valve stem 12 and is formed with an annular flange 29 at the inner side thereof. The flange 29 is adapted to be crimped over the head 30 formed on the outer end of the fitting body 24. The connection between the flange 29 and the head 30 is such as to enable rotation of the cap 25 relative to the body 24 and at the same time prevent disengagement of the cap 25 from the body.

The sealing gasket 26 forms a seal between the cap 25 and the body 24 to prevent the escape of air from the fixture when the latter is assembled on the valve stem 12. In the present instance the gasket 26 is formed of ductile metal although various other materials having sealing characteristics may be employed. Regardless of the material from which the gasket 26 is formed means is provided on the gasket for engaging the tire valve 13 and for moving the latter to its open position. This means is shown in Figure 2 of the drawing as comprising a substantially U-shaped projection 31 on the gasket 26. The leg portions of the projection 31 are formed integral with the gasket 26 at diametrically opposite sides of the latter and the base portion of the projection is positioned to engage the tire valve 13 upon threading the cap 25 on the valve stem 12. It follows from the above that the tire valve 13 is automatically opened in response to threading the cap 25 of the fitting onto the outer end of the valve stem 12.

Thus from the foregoing it will be noted that the check valve and associated parts are divorced from the pump proper and may be readily removed from the extremity of the hose or flexible conduit 22 for cleaning purposes. It will also be noted that the means for opening the tire valve prior to inflating the pneumatic tire forms a part of the fitting containing the check valve. Thus the check valve and the tire valve operating means form a self-contained unit which may be inexpensively manufactured and readily installed.

What we claim as our invention is:

1. A pump fitting for use in connection with a pneumatic tire having a valve stem embodying a normally closed valve, said fitting including an elongated body adapted to be detachably connected to an air pump by means of a suitable conduit and having an axially extending passageway therethrough, a check valve in said passageway for controlling the flow of air therethrough, a cap internally threaded for threadably engaging the tire valve stem and secured to one end of said body for rotation relative thereto, an annular sealing gasket secured between said body end and said cap so as to seal the joint therebetween, and a projection formed integrally on said gasket and projecting into said cap so as to engage and open the valve in the tire valve stem when the cap is threaded on the latter.

2. A pump fitting for use in connection with a pneumatic tire having a valve stem embodying a normally closed valve, said fitting including an elongated body adapted to be detachably connected to an air pump by means of a suitable conduit and having an axially extending passageway therethrough, said passageway being reduced in diameter intermediate the ends thereof so as to form an annular valve seat, a check valve in the form of a ball disposed in said passageway for engagement with said valve seat and adapted to be moved out of engagement with said valve seat by air pressure from the pump and moved into engagement with said valve seat by air pressure from a tire, a cap internally threaded for threadably engaging the tire valve and secured to one end of said body for rotation relative thereto, an annular sealing gasket secured between said body end and said cap so as to seal the joint between said cap and body, and an integrally formed projection on said gasket projecting into said cap so as to engage and open the valve in the tire valve stem when the cap is threaded on the latter.

JOHN M. NICKELSEN.
HENRY W. EMERICK.

REFERENCES CITED

The following references are of record in the file of this patent:

UNITED STATES PATENTS

| Number | Name | Date |
| --- | --- | --- |
| 387,064 | Gibbs | July 31, 1888 |
| 838,219 | Stapley | Dec. 11, 1906 |
| 909,373 | Desmond | Jan. 12, 1909 |
| 1,289,451 | Hougen | Dec. 31, 1918 |
| 1,364,441 | Kraft | Jan. 4, 1921 |
| 1,492,838 | Dilweg | May 6, 1924 |
| 1,503,068 | Sladek | July 29, 1924 |
| 1,846,189 | Downs | Feb. 23, 1932 |
| 2,189,361 | Hoge | Feb. 6, 1940 |